United States Patent
Wang et al.

(10) Patent No.: US 12,494,042 B2
(45) Date of Patent: Dec. 9, 2025

(54) IMAGE PROCESSING METHOD, IMAGE PROCESSING SYSTEM, AND NON-TRANSITORY COMPUTER READABLE MEDIUM

(71) Applicant: CANON MEDICAL SYSTEMS CORPORATION, Tochigi (JP)

(72) Inventors: Sha Wang, Beijing (CN); Bing Han, Beijing (CN); Fanjie Meng, Beijing (CN); Qiqi Xu, Beijing (CN); Ye Yue, Beijing (CN)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 303 days.

(21) Appl. No.: 18/329,832

(22) Filed: Jun. 6, 2023

(65) Prior Publication Data

US 2023/0394791 A1    Dec. 7, 2023

(30) Foreign Application Priority Data

Jun. 6, 2022    (CN) .......................... 202210630102.6

(51) Int. Cl.
  *G06V 10/764*    (2022.01)
  *A61B 5/00*    (2006.01)
  (Continued)

(52) U.S. Cl.
  CPC .......... *G06V 10/764* (2022.01); *A61B 5/7267* (2013.01); *G06F 18/25* (2023.01);
  (Continued)

(58) Field of Classification Search
  CPC ...... G06N 3/045; G06N 20/00; G06N 3/0464; G06N 5/04; G06N 3/02; G06N 5/045;
  (Continued)

(56) References Cited

U.S. PATENT DOCUMENTS 10,825,168 B2    11/2020    Tegzes et al.
11,257,575 B2 *    2/2022    Lyman ...................... G06T 7/11
(Continued)

FOREIGN PATENT DOCUMENTS

JP    2021-144461 A    9/2021
JP    2022-2027 A    1/2022
JP    2022095099 A *    6/2022

OTHER PUBLICATIONS

Search machine translation of JP-2022-095099-A to Kotaro, translated Jul. 14, 2025, 13 pages. (Year: 2025).*
(Continued)

*Primary Examiner* — Henok Shiferaw
*Assistant Examiner* — Dennis Rosario
(74) *Attorney, Agent, or Firm* — Oblon, McClelland, Maier & Neustadt, L.L.P.

(57) ABSTRACT

An image processing method according to an embodiment includes a specifying step, an inference step, and an integration step. In the specifying step, a first portion including a region corresponding to an anatomical site of a target and a second portion including a region different from the anatomical site are specified in the image. In the inference step, by using a deep learning model, segmentation of the region corresponding to the anatomical site is performed on the first portion and segmentation of the region different from the anatomical site is performed on the second portion, or classification and detection of an image including the region corresponding to the anatomical site is performed on the first portion and classification and detection of an image including the region different from the anatomical site is performed on the second portion. In the integration step, results of the respective processes are integrated for output.

8 Claims, 14 Drawing Sheets

(51) Int. Cl.
| | |
|---|---|
| *G06F 9/455* | (2018.01) |
| *G06F 18/25* | (2023.01) |
| *G06N 3/02* | (2006.01) |
| *G06N 5/04* | (2023.01) |
| *G06N 5/045* | (2023.01) |
| *G06N 5/046* | (2023.01) |
| *G06N 20/00* | (2019.01) |
| *G06N 20/20* | (2019.01) |
| *G06T 5/60* | (2024.01) |
| *G06T 7/10* | (2017.01) |
| *G06T 7/11* | (2017.01) |
| *G06T 7/12* | (2017.01) |
| *G06V 10/25* | (2022.01) |
| *G06V 10/26* | (2022.01) |
| *G06V 10/80* | (2022.01) |
| *G06V 10/82* | (2022.01) |
| *G06V 20/69* | (2022.01) |
| *G16H 50/30* | (2018.01) |

(52) U.S. Cl.
CPC .............. *G06N 3/02* (2013.01); *G06N 5/04* (2013.01); *G06N 5/042* (2013.01); *G06N 5/045* (2013.01); *G06N 5/046* (2013.01); *G06N 20/00* (2019.01); *G06N 20/20* (2019.01); *G06T 5/60* (2024.01); *G06T 7/10* (2017.01); *G06T 7/11* (2017.01); *G06T 7/12* (2017.01); *G06V 10/25* (2022.01); *G06V 10/26* (2022.01); *G06V 10/80* (2022.01); *G06V 10/82* (2022.01); *G06V 20/695* (2022.01); *G16H 50/30* (2018.01); *G06F 2009/4557* (2013.01); *G06T 2207/20084* (2013.01); *G06T 2207/20112* (2013.01); *G06T 2207/20128* (2013.01); *G06T 2207/20152* (2013.01); *G06T 2207/30004* (2013.01); *G06T 2207/30056* (2013.01); *G06V 2201/03* (2022.01)

(58) Field of Classification Search
CPC ........ G06N 5/042; G06N 5/046; G06N 20/20; G06V 2201/031; G06V 10/26; G06V 10/25; G06V 20/695; G06V 10/70; G06V 10/80; G06V 30/18057; G06V 20/69; G06V 2201/032; G06V 2201/034; G06V 10/50; G06V 2201/03; G06V 10/82; G06T 2207/20084; G06T 2207/20081; G06T 7/0012; G06T 7/11; G06T 7/10; G06T 7/12; G06T 3/4046; G06T 2207/10081; G06T 2207/10088; G06T 5/60; G06T 2207/30004; G06T 2207/30056; G06T 2207/20221; G06T 2207/30096; G06T 2207/30024; G06T 2207/10116; G06T 2207/30196; G06T 2207/20021; G06T 2207/30008; G06T 2207/30016; G06T 2207/30068; G06T 2210/41; G06T 7/13; G06T 7/215; G06T 11/003; G06T 2207/30081; G06T 2207/10068; G06T 2207/20112; G06T 2207/20152; G06T 2207/20128; G06T 2207/30032; G06T 2207/30101; G06T 2207/30104; G06T 2207/10136; G06T 2207/30028; G06T 2211/40; G06T 2207/10076; G06T 2207/30036; G06T 2207/30041; G06T 2207/30092; G06T 2207/30044; G06T 2207/30048; G06T 2207/30052; G06T 2207/30061; G06T 2207/30064; G06T 2207/30072; G06T 2207/30076; G06T 2207/30084; G06T 2207/30088; G06T 2207/30201; G06T 2207/10064; G06T 2207/10056; G06T 2207/10132; G06F 18/25; G06F 2009/4557; G06F 16/51; G06F 16/71; G06F 16/61; G06F 16/55; G06F 16/75; G16H 30/40; G16H 30/20; G16H 50/30; G16H 30/00; A61B 2090/374; A61B 2090/3762; A61B 2090/378; A61B 5/7264; A61B 5/7267; A61B 5/055; A61B 6/032; A61B 6/5235; A61B 5/0042; A61B 6/5229; A61B 2034/105; A61B 2090/376; A61B 2090/3764; A61B 8/5207; A61B 5/0013; A61B 5/004; A61B 5/0035; A61B 5/0088; A61B 6/03; A61B 6/482; A61B 8/0883; A61B 8/085; A61B 8/4416; A61B 90/361; A61B 90/37; A61B 90/10; A61B 5/0091; A61B 5/0033; A61B 5/0037; A61B 5/0044; A61B 5/0046; A61B 5/0066; A61B 5/0073; A61B 6/025; A61B 6/022; A61B 6/484; A61B 6/485; A61B 6/486; A61B 6/488; A61B 6/502; A61B 6/501; A61B 6/50; A61B 6/503; A61B 6/504; A61B 6/505; A61B 6/507; A61B 6/508; A61B 6/51; A61B 6/512; A61B 6/506; A61B 6/5223; A61B 6/5241; A61B 6/5247; A61B 6/5252; A61B 2090/371; A61B 2090/364; A61B 2576/00; A61B 2576/02; A61B 2576/023; A61B 2576/026; A61B 1/00009; A61B 1/005; A61B 1/00186; A61B 1/041; A61B 1/04; A61B 1/042; A61B 1/043; A61B 1/044; A61B 1/046; A61B 1/05; A61B 3/102; A61B 5/0522; A61B 5/0515; A61B 5/0536

See application file for complete search history.

(56) References Cited

U.S. PATENT DOCUMENTS

| | | | |
|---|---|---|---|
| 12,106,554 B2* | 10/2024 | Livet | ................. G06T 7/20 |
| 2019/0205606 A1 | 7/2019 | Zhou et al. | |
| 2021/0287046 A1 | 9/2021 | Okuno | |
| 2022/0101034 A1* | 3/2022 | Ekin | ................. G06V 10/462 |
| 2025/0022138 A1* | 1/2025 | Liu | ................. G06T 7/194 |

OTHER PUBLICATIONS

Kendall et al., "What Uncertainties Do We Need in Bayesian Deep Learning for Computer Vision?", 31st Conference on Neural Information Processing Systems (NIPS 2017), arXiv:1703.04977v2, 36 pages.

Office Action issued May 30, 2025, in corresponding Chinsese Patent Application No. 202210630102.6, 6 pages.

* cited by examiner

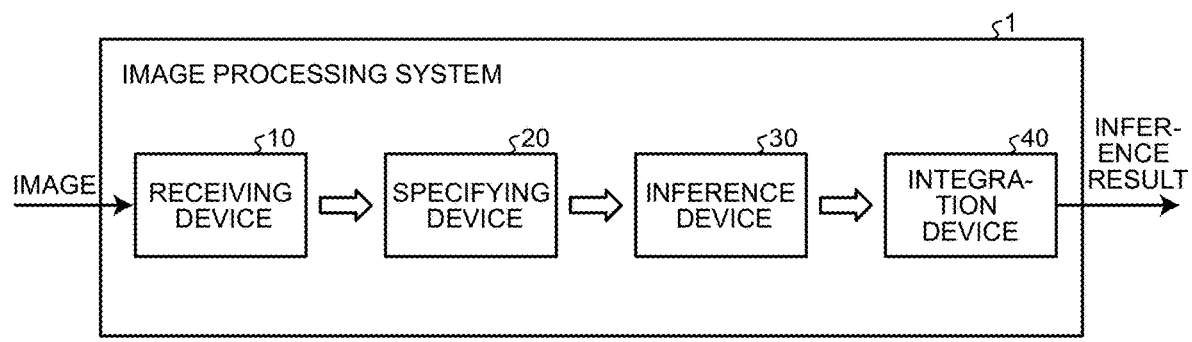
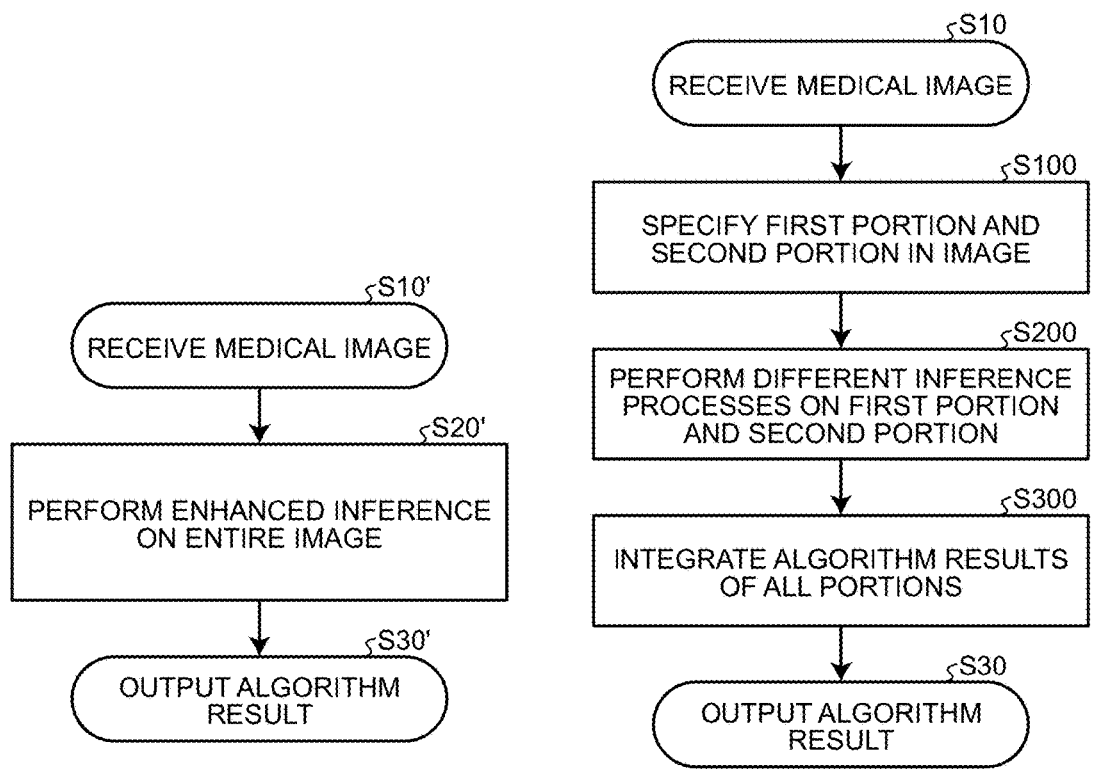

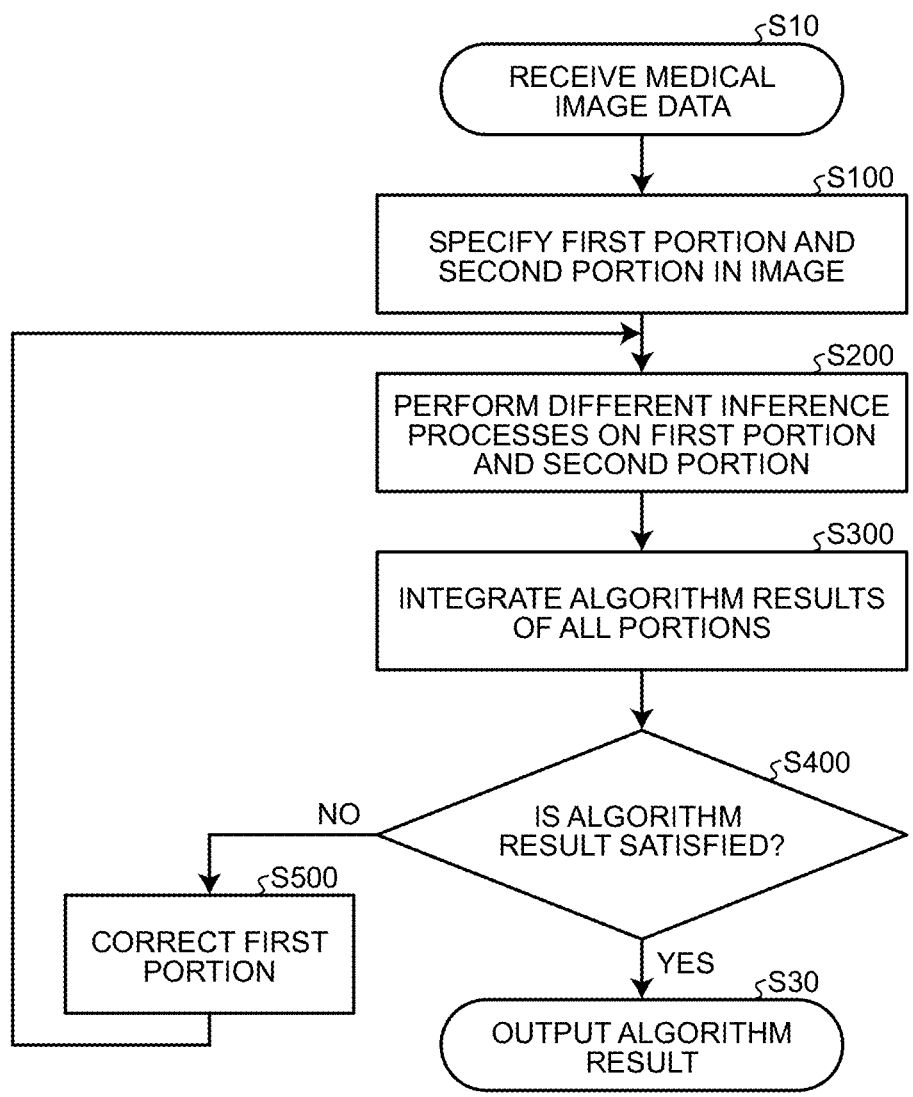

☒ FIRST PORTION: PIXEL WITH INFERENCE PROBABILITY OF 0.05 to 0.95

☒ SECOND PORTION: PIXEL WITH INFERENCE PROBABILITY SMALLER THAN 0.05 or GREATER THAN 0.95

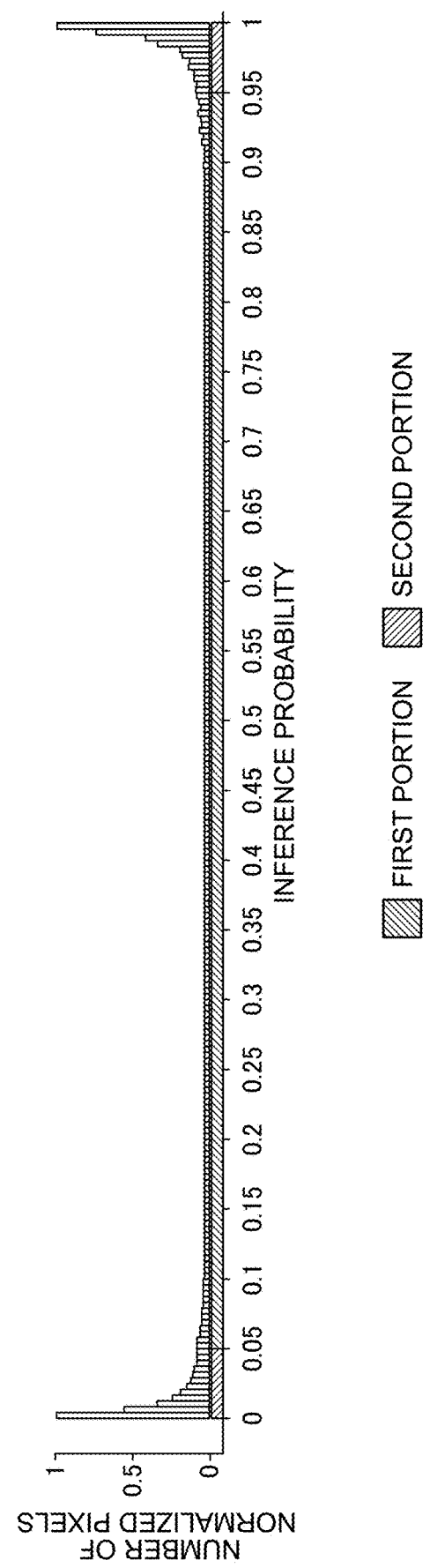

FIG.12
 FIRST PORTION
 SECOND PORTION
 ADDED SINGLE CHANNEL INFERENCE POSITION

FIG.14
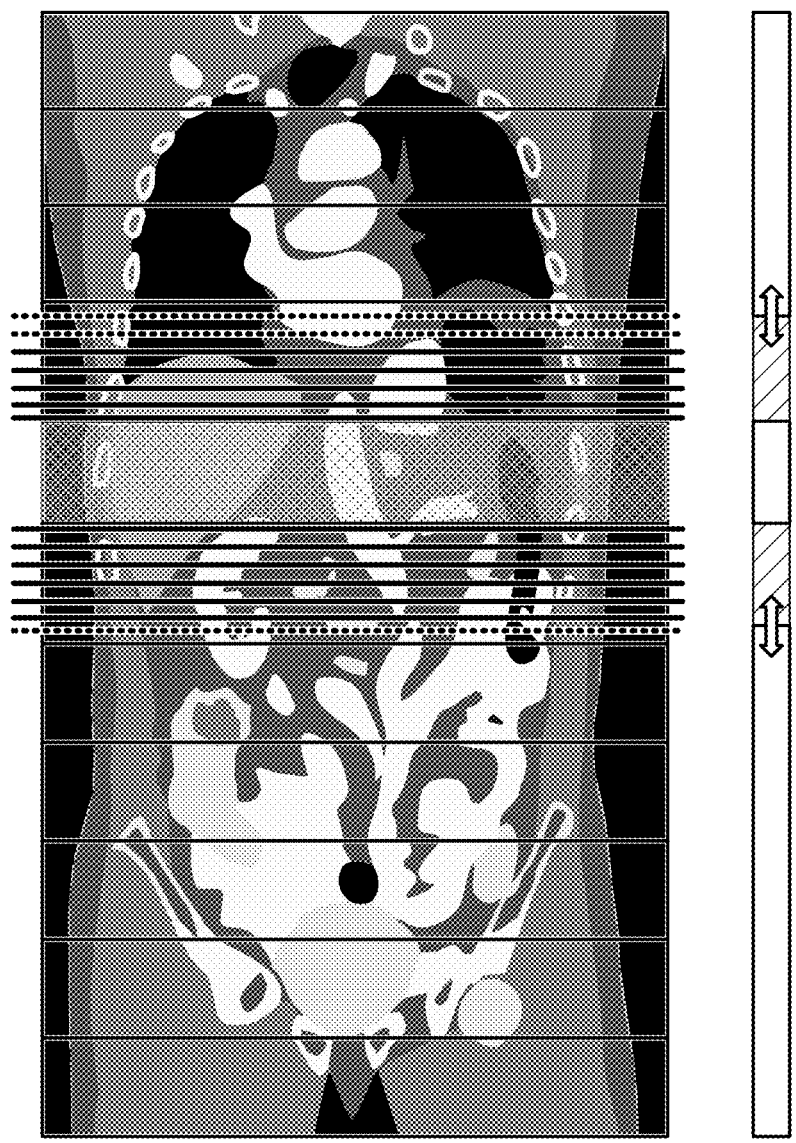
 FIRST PORTION   SECOND PORTION

IMAGE PROCESSING METHOD, IMAGE PROCESSING SYSTEM, AND NON-TRANSITORY COMPUTER READABLE MEDIUM

CROSS-REFERENCE TO RELATED APPLICATIONS

This application is based upon and claims the benefit of priority from Chinese Patent Application No. 202210630102.6, filed on Jun. 6, 2022; the entire contents of which are incorporated herein by reference.

FIELD

Embodiments described herein relate generally to an image processing method, an image processing system, and a non-transitory computer readable medium.

BACKGROUND

Deep learning is currently an important technical means of performing image processing such as segmentation, classification, and detection on an image. A complete deep learning framework includes two main parts: a training process; and an inference process. The training process is a process of training a model by using a training data set with a label (true value: GT, also referred to as Ground Truth). The inference process is a process of inputting unlabeled live data into an already trained model to acquire an actual detection value.

In the inference process, when the trained model is used to infer an image, the inference results may be inaccurate. Such inaccurate inference results are particularly noticeable with respect to certain parts of the image, for example, edges of an organ, edges of a tumor, and boundary parts such as organ defect sites due to partial organ resection.

BRIEF DESCRIPTION OF THE DRAWINGS

FIG. 1 is a block diagram illustrating an example of the configuration of an image processing system according to the present embodiment;

FIG. 2 is a comparative diagram for explaining features of a process performed by the image processing system according to the present embodiment;

FIG. 3 is a flowchart illustrating an example of a process performed by the image processing system according to the present embodiment;

FIG. 6B is a schematic diagram illustrating the principle of specifying a first portion and a second portion by the image processing system according to the first embodiment and the effects thereof;

FIG. 12 is a schematic diagram illustrating a processing status of step S200 by the image processing system according to the second embodiment;

FIG. 14 is a schematic diagram illustrating a processing status of step S500 by the image processing system according to the second embodiment.

DETAILED DESCRIPTION

Figure 4:
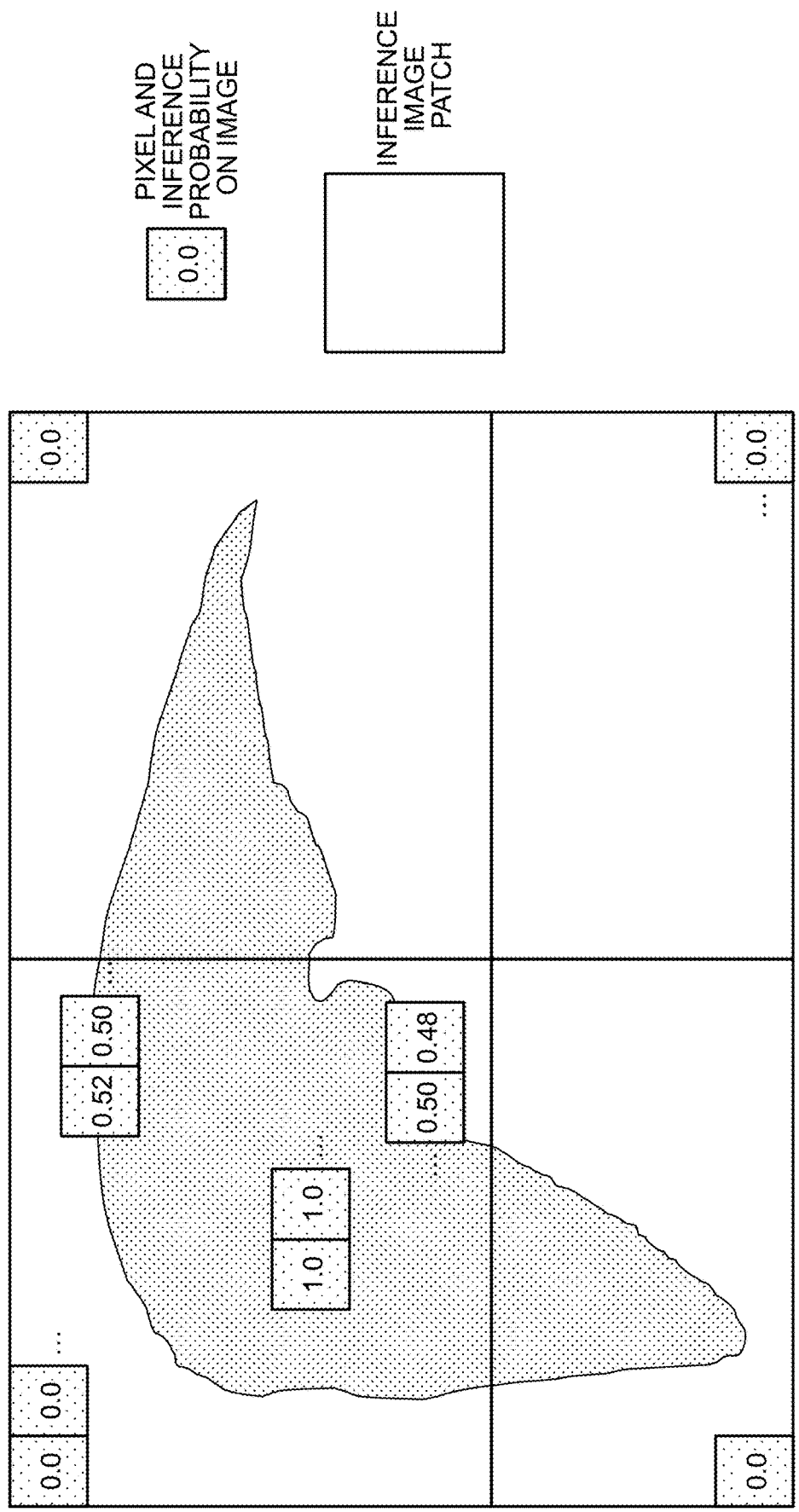
FIG. 4 is a schematic diagram illustrating preprocessing of a processing procedure for specifying a first portion and a second portion by an image processing system according to a first embodiment.

An image processing method according to an embodiment is an image processing method of performing an inference process on image data by using a trained deep learning model, and includes a receiving step, a setting step, a specifying step, an inference step, and an integration step. The receiving step receives an image. The setting step sets an anatomical site of a target. The specifying step specifies a first portion and a second portion in the image, the first portion including a region corresponding to the anatomical site of the target, the second portion including a region different from the anatomical site of the target. By using the deep learning model, the inference step performs, as a first inference process, a segmentation process of specifying the region corresponding to the anatomical site of the target with respect to the first portion and performs, as a second inference process, a segmentation process of specifying the region different from the anatomical site of the target with respect to the second portion, or performs, as the first inference process, a classification process of classifying and detecting an image including the region corresponding to the anatomical site of the target with respect to the first portion and performs, as the second inference process, a classification process of classifying and detecting an image including the region different from the anatomical site of the target with respect to the second portion. The integration step integrates results of the first inference process and the second inference process and outputs an integrated result.

Embodiments of an image processing system, an image processing method, and a non-transitory computer readable medium according to the present application are described below.

The present embodiment relates to an image processing method, an image processing system, and a non-transitory computer readable medium. Particularly, the present embodiment relates to an image processing method and an image processing system that can achieve both accuracy and speed of an inference process in deep learning in an image processing method based on the deep learning.

Deep learning is currently an important technical means of performing image processing such as segmentation, classification, and detection on an image. A complete deep learning framework includes two main parts: a training process and an inference process. The training process inputs a training data set with a label (true value: GT, also referred to as Ground Truth) to a model, calculates a target function (loss function) between an output detection result and the true value, and corrects a network parameter by a gradient descent method, a stochastic gradient descent method, or the like to minimize the loss function. The training process is repeated until an error between the network output detection result and the true value satisfies predetermined accuracy, thereby bringing the model to a convergence state and reducing an error in a prediction value of the model to complete the training of the model. The inference process is also a process of inputting unlabeled live data into an already trained model to acquire an actual detection value.

In the inference process, when the trained model is used to infer an image, inference results may be inaccurate. Such inaccurate inference results are particularly noticeable with respect to certain parts of the image, for example, edges of an organ, edges of a tumor, and boundary parts such as organ defect sites due to partial organ resection.

Several methods have been proposed in the related art in order to improve the accuracy of inference in deep learning. For example, Patent Literature 1 discloses an artificial intelligence-based medical image segmentation method and system that can adaptively employ appropriate algorithms to perform an inference process on the same set of images. Specifically, the technique of Patent Literature 1 performs segmentation by automatically selecting one or a plurality of appropriate deep learning models according to features such as image scanning protocols and organ features of the image. When a plurality of models are selected, an inference result of a previous model and an original image are concatenated by a method of model concatenation and used as input for a next model.

Patent Literature 2 discloses a method and system for automatic machine learning of organ segmentation that focuses on organ segmentation, performs multi-channel inference by using image patches having different sizes, and concatenates results of the multi-channel inference as input for the last layer of a deep learning network.

Patent Literature 3 discloses a learning device and an inference device using a machine learning model that reduces an average time for data processing by determining whether target image data has a predictable region that can easily predict an inference result of an inference process, performing predetermined data processing on a data region designated as a predictable region, and outputting data necessary for inferring a non-predictable region to the machine learning model.

In the related art, in order to improve the accuracy of an inference process, an attempt has also been made to perform a precise process by using a modified inference algorithm, and such a modified inference process is referred to as "enhanced inference". Specific examples of the enhanced inference include increasing an overlap ratio between image patches used during inference when segmenting an image, performing inference on all images when classifying the images, and performing inference again after performing flipping, scaling, or the like on an image when detecting the image.

In the related art, when performing the enhanced inference described above, these enhanced inference processes are employed for all images to be processed, which increases the processing time of an algorithm. Therefore, the related art has a technical problem that it is not possible to achieve both accuracy and processing speed in image processing using the enhanced inference.

The present embodiment has been made to solve the above problems of the related art. The present embodiment proposes a new method of achieving both accuracy and speed of an inference process in a deep learning algorithm. The present embodiment first divides an image to be processed into a first portion and a second portion. The first portion is a portion of the image to be processed where the deep learning algorithm is likely to obtain an inaccurate result, for example, a portion near a location in the image where an inference process result suddenly changes. The second portion is a portion, other than the first portion, in the image to be processed. The present embodiment performs a first inference process and a second inference process, which are different inference processes, on the first portion and the second portion, respectively. For example, the present embodiment performs precise enhanced inference on the first portion and faster normal inference on the second portion. Then, the present embodiment combines processing results of the enhanced inference and the normal inference as a processing result for the entire image.

Specifically, an aspect of the present embodiment is an image processing method of performing an inference process on image data by using a trained deep learning model, and provides an image processing method including a receiving step of receiving an image, a specifying step of specifying a first portion and a second portion in the received image, an inference step of using the deep learning model to perform a first inference process on the specified first portion and a second inference process, which is an inference process different from the first inference process, on the specified second portion, and an integration step of integrating results of the first inference process and the second inference process and outputting an integrated result.

Another aspect of the present embodiment is an image processing system that performs an inference process on image data by using a trained deep learning model, and provides an image processing system including a receiving device that receives an image, a specifying device that specifies a first portion and a second portion in the received image, an inference device that uses the deep learning model to perform a first inference process on the specified first portion and a second inference process, which is an inference process different from the first inference process, on the specified second portion, and an integration device that integrates results of the first inference process and the second inference process and outputs an integrated result.

According to the present embodiment, an image to be processed is divided into the first portion, which is a portion near a location in the image where an inference process result suddenly changes, and the second portion other than the first portion. Different inference processes are performed on the first portion and the second portion, respectively. Specifically, precise enhanced inference is performed on the first portion and faster normal inference is performed on the second portion. Then, processing results of the enhanced inference and the normal inference are integrated to obtain a processing result for the entire image. This makes it possible to implement a balance between accuracy and speed during deep learning model inference, and achieve more desirable inference results.

Embodiments of an image processing system, an image processing method, and a non-transitory computer readable medium according to the present application are described in detail below with reference to the accompanying drawings. The image processing system, the image processing method, and the non-transitory computer readable medium according to the present application are not limited by the following embodiments. In the following description, the same components are given common reference numerals, and redundant description is omitted.

An overview of an image processing system according to the present embodiment is first described. The image processing system of the present application may exist in the form of a medical image diagnostic apparatus such as an ultrasonic diagnostic apparatus, a computed tomography (CT) imaging apparatus, or a magnetic resonance imaging (MRI) imaging apparatus, or exist independently in the form of a workstation or the like.

FIG. 1 is a block diagram illustrating an example of the configuration of the image processing system according to the present embodiment.

An image processing system 1 according to the present embodiment performs an inference process on an input image by using a deep learning neural network. As illustrated in FIG. 1, the image processing system 1 mainly includes a receiving device 10, a specifying device 20, an inference device 30, and an integration device 40. The receiving device 10 receives an image to be processed. The specifying device 20 sets an anatomical site of a target, and specifies a first portion and a second portion, other than the first portion, in the image received by the receiving device 10, the first portion including a region corresponding to the anatomical site of the target, the second portion including a region different from the anatomical site of the target. In the present embodiment, the first portion is a portion of the image to be processed where an algorithm of a deep learning model is likely to obtain an inaccurate result, for example, a portion near a location in the image where an inference process result suddenly changes. Details of the first portion are described below. The inference device 30 uses a trained deep learning model to perform a first inference process and a second inference process, which are different inference processes, on the first portion and the second portion specified by the specifying device 20, respectively.

The integration device 40 integrates inference results acquired by the different inference processes and outputs an integrated result.

The image processing system 1 may be provided in, for example, an image processing system such as an ultrasonic diagnostic apparatus. In this case, the image processing system 1 further includes a control unit, an ultrasound probe, a display, an input/output interface, a device body, and the like, which are not illustrated in the drawing. The receiving device 10, the specifying device 20, the inference device 30, and the integration device 40 are provided in the control unit and are communicably connected to these ultrasound probe, display, input/output interface, device body, and the like. Since the configurations, functions, and the like of the control unit, the ultrasound probe, the display, the input/output interface, and the device body are well known to those skilled in the art, detailed description thereof is omitted.

A process performed by the image processing system 1 according to the present embodiment is described in detail below.

FIG. 2 is a comparative diagram for explaining features of a process performed by the image processing system according to the present embodiment.

FIG. 2 illustrates the features of the process according to the present embodiment by means of comparison with the flow of the related art. In FIG. 2, the left side denotes a flowchart of image processing in the related art, and the right side denotes a flowchart of the process performed by the image processing system according to the present embodiment. As illustrated in FIG. 2, in the process performed by the image processing system according to the present embodiment, step S100, step S200, and step S300 are characteristic steps of the present embodiment. While the related art performs enhanced inference on an entire image at step S20', the present embodiment first specifies a first portion and a second portion in an image to be processed at step S100. Subsequently, at step S200, the present embodiment performs a first inference process and a second inference process, which are different inference processes, on the specified first portion and second portion, respectively. Specifically, as will be described below with reference to FIG. 3, precise enhanced inference is used for the first portion, and faster normal inference is used for the second portion. Subsequently, at step S300, the present embodiment integrates processing results of the enhanced inference and the normal inference to obtain a processing result for the entire image. The image processing system according to the present embodiment divides the image to be processed into the first portion and the second portion and performs the first inference process and the second inference process, which are different inference processes, respectively, so that the present embodiment can implement a balance between accuracy and speed during deep learning model inference and achieve more desirable inference results, unlike the related art that performs enhanced inference on the entire image to be processed.

Details of the process performed by the image processing system according to the present embodiment are described in detail below with reference to FIG. 3.

FIG. 3 is a flowchart illustrating an example of the process performed by the image processing system according to the present embodiment.

First, at step S10, the image processing system 1 receives medical image data to be processed by the receiving device 10.

Since the processes of subsequent step S100, step S200, step S300, and step S30 have been described above with reference to FIG. 2, description thereof is omitted.

In accordance with the image processing system according to the present embodiment, a determination step S400 and a correction step S500 may be further provided between step S300 and step S30. At step S400, the image processing system 1 determines whether the integrated algorithm result is satisfied. This step may be performed by setting a predetermined threshold in advance for a technical index indicating the result of the inference process and comparing the index of the integrated result with the threshold, or may be performed by a user of the image processing system 1 who makes an artificial determination.

When the determination result at step S400 satisfies the integrated result (YES at step S400), the process proceeds to step S30, outputs the algorithm result, and terminates the process. On the other hand, when the determination result of step S400 does not satisfy the integrated algorithm result (NO at step S400), the process proceeds to step S500 to correct the first portion specified at step S100. The processes of step S200 and step S300 are further performed on the corrected first portion and the second portion other than the first portion until the determination result at step S400 is "YES", and the determination of step S400 is performed again on the integrated algorithm result. The process of step S500 may be automatically performed by the correction function of the image processing system 1 according to preset rules, or may be artificially performed by a user via the user interface of the image processing system 1.

Step S400 and step S500 are not essential. As illustrated in FIG. 2, even a method including only step S10, step S100, step S200, step S300, and step S30 can achieve the purpose of the present embodiment and obtain effects of the present embodiment.

The overview of the process performed by the image processing system according to the present embodiment has been described above. The present embodiment is described in detail below using a segmentation process and a classification process as examples.

First Embodiment

The first embodiment is an example in which the image processing system according to the present embodiment is applied to image segmentation.

The first embodiment is described in detail below with reference to FIG. 4, FIGS. 5A and 5B, FIGS. 6A to 6C, FIGS. 7 and 8, and FIGS. 9A and 9B by using a segmentation process for the liver as an example.

With reference to FIG. 4, FIGS. 5A and 5B, and FIGS. 6A to 6C, a process of specifying a first portion and a second portion at step S100 in the first embodiment is first described.

FIG. 4 is a schematic diagram illustrating preprocessing of a processing procedure for specifying the first portion and the second portion by the image processing system according to the first embodiment.

FIG. 4 illustrates an example of performing the segmentation process on a single image to be processed. A large rectangular frame in the drawing represents the entire image to be processed, four large blocks in the rectangular frame represent image patches to be subjected to the segmentation process, a small dark block in the image patch represents a single pixel, and the number in the small block represents the inference probability of a pixel. The rectangular frame and the size and number of the blocks are merely schematic representations for convenience of description. The size contrast in the drawing is not to match with the actual size scale, and the actual number may be other than the number illustrated. This point is the same for all attached drawings.

As illustrated in FIG. 4, when the image processing system according to the first embodiment performs the segmentation process to the liver on medical image data, the specifying device 20 first performs normal inference on the entire single image to be processed by the deep learning model at step S100. The "normal inference" in the present embodiment refers to light inference having lower accuracy, lower processing load, and higher speed than enhanced inference. Specifically, the normal inference of the present embodiment is inference performed using large image patches, for example, as illustrated in FIG. 4. The specifying device 20 acquires a matrix having the inference probability of each pixel in the entire image by performing light inference on the entire single image to be processed. The inference probability is an example of an "inference result index" in the present embodiment, and when segmentation of a target region (for example, liver) is performed on an image to be processed, the inference probability is the probability that a pixel indicated by a segmentation result belongs to the target region (liver). In FIG. 4, a dark-colored portion in the image is the target region (liver), and a light-colored background portion is a region other than the target region (liver).

As illustrated in FIG. 4, inside the dark-colored liver region, the segmentation result for each pixel obtained by the light inference is that the pixel belongs to the liver region, so the inference probability of each pixel obtained accordingly is 1.0. In the light-colored region, the segmentation result for each pixel is that the pixel does not belong to the liver region, so the inference probability of each pixel obtained accordingly is 0.0. In the vicinity of a boundary between the dark-colored region and the light-colored region, the segmentation result for each pixel is that the pixel belongs to the liver region with a certain probability between 0.0 and 1.0, so accordingly, as illustrated in FIG. 4, for example, respective inference probabilities of four pixels at the boundary are 0.52, 0.50, 0.50, 0.48, and the like. In this way, in the image to be processed illustrated in FIG. 4, there is a location in a region near the boundary between the dark-colored region and the light-colored region where the inference probability, which is the result of the inference process in the present embodiment, suddenly changes, for example, from 0.0 to a value greater than 0.0 and smaller than 1.0, or from 1.0 to a value greater than 0.0 and smaller than 1.0. In the present embodiment, such a region near a location in the image to be processed where the inference process result suddenly changes is specified as the first portion.

In the case of the first embodiment in which segmentation is performed on an image, the first portion and the second portion in the image in the present embodiment are different regions in one image, and specifically refer to an important region that is important for the segmentation and an unimportant region that is not important for the segmentation, respectively.

A procedure for specifying the first portion and the second portion by the image processing system according to the first embodiment is described in detail below.

Figure 5A:
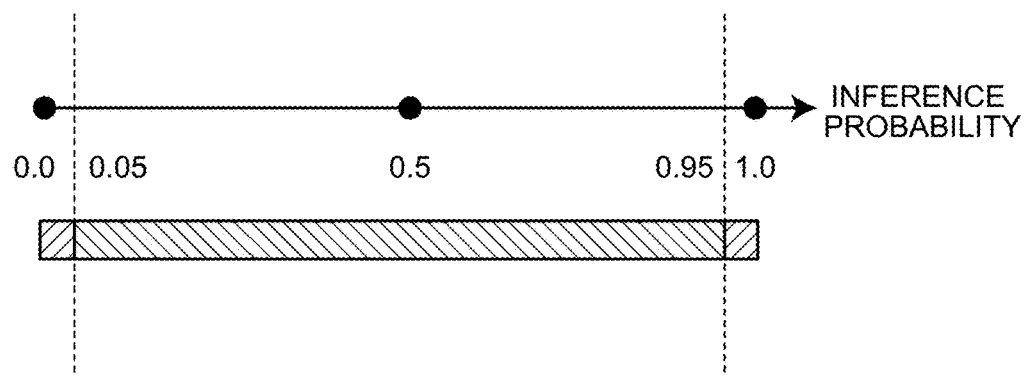
FIG. 5A is a schematic diagram illustrating a processing procedure for specifying a first portion and a second portion by the image processing system according to the first embodiment.
Figure 5B:
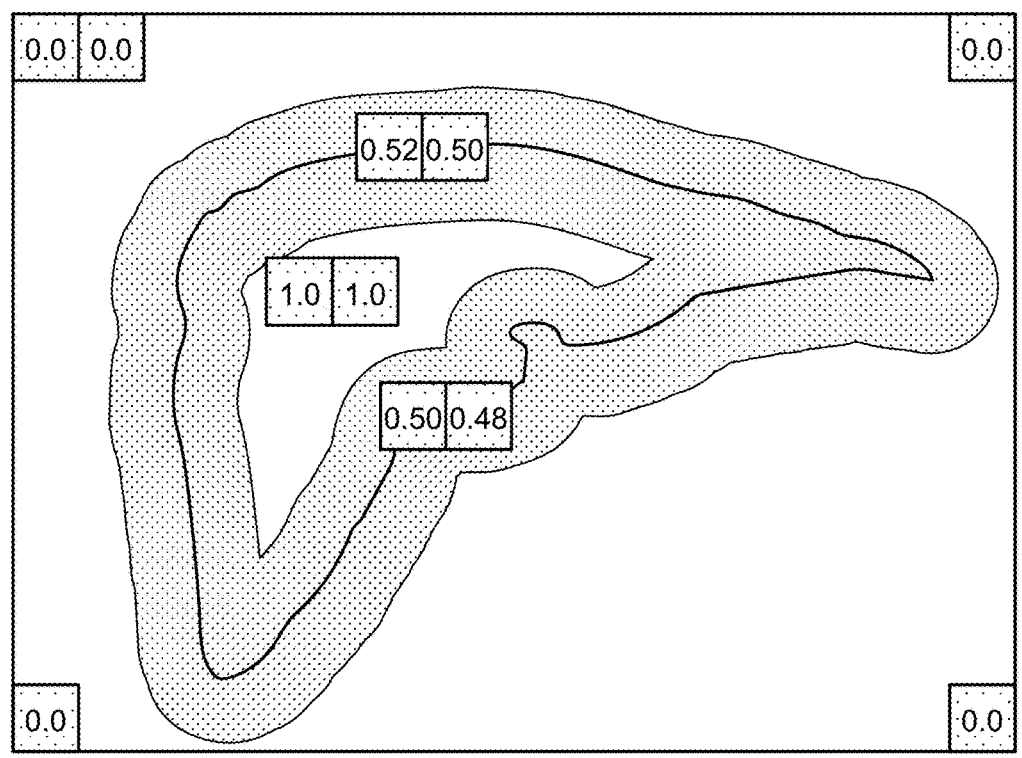
FIG. 5B is a schematic diagram illustrating a processing procedure for specifying a first portion and a second portion by the image processing system according to the first embodiment.

FIGS. 5A and 5B are schematic diagrams illustrating a processing procedure for specifying the first portion and the second portion by the image processing system according to the first embodiment.

As illustrated in FIGS. 5A and 5B, after obtaining an inference probability matrix for each pixel included in the entire image to be processed as illustrated in FIG. 4, the specifying device 20 specifies the first portion and the second portion on the basis of the inference probability matrix.

First, as illustrated in FIG. 5A, in the present embodiment, the specifying device 20 sets an important region inference probability range with a lower limit value greater than 0.0 and an upper limit value smaller than 1.0 on the basis of the obtained inference probability matrix, specifies, as the first portion, an image region including pixels within the important region inference probability range in which an inference probability value is set, and specifies an image region other than the first portion as the second portion.

In FIG. 5A, as an example, the lower limit value is set to 0.05, the upper limit value is set to 0.95, and the important region inference probability range corresponding to the first portion is set as follows.

0.05≤inference probability≤0.95

That is, according to the first embodiment, the present embodiment specifies, as an important region, an image region including pixels with an inference probability of 0.05 to 0.95, that is, a dark-colored constant-width liver outline region in FIG. 5B, and specifies, as an unimportant region, an image region including pixels satisfying 0.0≤inference probability <0.05 or 0.95<inference probability ≤1.0, that is, a light-colored region in FIG. 5B. In the present embodiment, the important region and the unimportant region are examples of the first portion and the second portion, respectively.

Figure 6A:
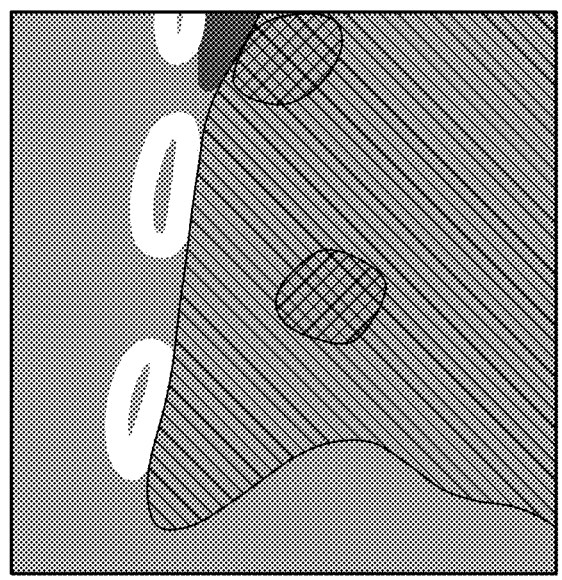
FIG. 6A is a schematic diagram illustrating the principle of specifying a first portion and a second portion by the image processing system according to the first embodiment and the effects thereof.
Figure 6C:
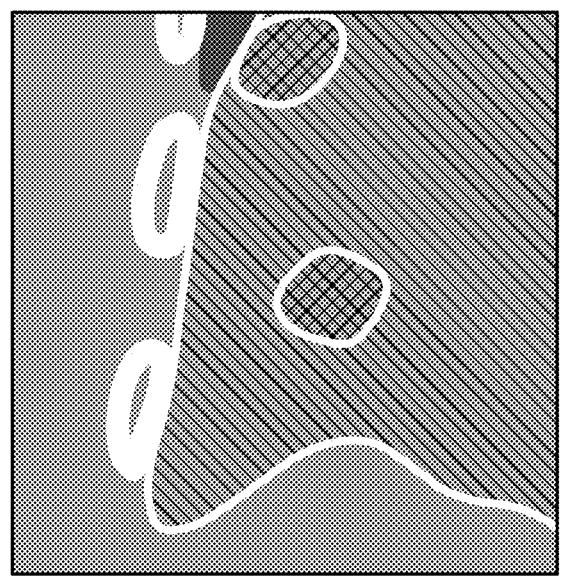
FIG. 6C is a schematic diagram illustrating the principle of specifying a first portion and a second portion by the image processing system according to the first embodiment and the effects thereof.

With reference to FIGS. 6A to 6C, the principle of the method of specifying the first portion and the second portion at step S100 and the effects thereof are described below.

FIGS. 6A to 6C are schematic diagrams illustrating the principle of specifying the first portion and the second portion by the image processing system according to the first embodiment and the effects thereof, taking the segmentation of a liver, a tumor, and a defect site of the liver as examples. FIG. 6A is a schematic diagram illustrating a real image as a processing target. FIG. 6B is a schematic diagram for explaining the principle of setting the important region inference probability range and the effects thereof. FIG. 6C is a schematic diagram illustrating an image in which the first portion and the second portion after segmentation are displayed.

As illustrated in FIG. 6A, a real medical image as a processing target includes the liver (hatched area in FIG. 6A), which is a segmentation target, and defect sites in the liver due to a tumor or surgical resection, for example (grid areas in FIG. 6A). As described above, the specifying device 20 performs segmentation on the liver, the tumor, and the defect sites, which are segmentation targets in FIG. 6A, by using light inference, so that an inference probability distribution illustrated in FIG. 6B is obtained. In FIG. 6B, the horizontal axis denotes the inference probability of each pixel, and the vertical axis denotes the number of pixels corresponding to the normalized inference probability. It can be seen from FIG. 6B that in the inference processing result, the number of pixels with an inference probability of near 0 or 1 is the largest, and the number of pixels with an inference probability in a range between a lower limit value of the inference probability that is slightly away from 0 and larger than 0 (for example, 0.05) and an upper limit value of the inference probability that is slightly away from 1 and smaller than 1 (for example, 0.95) is significantly small. Therefore, the present embodiment selects such an inference probability range in which the number of pixels is significantly small as the important region inference probability range, and thereby specifies an important region (first portion) corresponding to the important region inference probability range and an unimportant region (second portion) other than the important region.

In the present embodiment, the important region inference probability range is set to 0.05 to 0.95, but this is merely an example and the important region inference probability range of the present embodiment is not limited thereto. In the present embodiment, the important region inference probability range is set so that the difference between the lower limit value and 0 is 0.05 (=0.05-0) and the difference between the upper limit value and 1 is 0.05 (=1-0.95), that is, the difference between the lower limit value and 0 and the difference between the upper limit value and 1 are equal to each other; however, the present embodiment is not limited thereto and the important region inference probability range may be set so that the difference between the lower limit value and 0 and the difference between the upper limit value and 1 are different from each other. According to the present embodiment, an inference probability range in which the distribution of the number of pixels with inference probabilities near 0 or 1 is significantly small may be selected as the important region inference probability range. In the present embodiment, a normalization process is performed on the number of pixels to determine a range in which the distribution of the number of pixels is significantly small, from the distribution of normalized pixels; however, the present embodiment is not limited thereto. Since the definition that the distribution of the number of pixels is significantly small and the specifying method thereof can employ other methods known to those skilled in the art and are not a key point of the present embodiment, detailed description thereof is omitted.

In accordance with the image processing system according to the first embodiment, by setting the important region inference probability range to 0.05 to 0.95, an important region (first portion) such as the one illustrated in FIG. 6C is specified. As can be seen from FIG. 6C, pixels with an inference probability range between 0.05 and 0.95 constitute the outer edge of the liver with a certain width and the outline of the tumor or the defect side, and the outer edge of the liver and the outline of the tumor or the defect side are important targets for segmentation of the medical image to be processed. By the specifying step S100 of the present embodiment, the outer edge of the liver and the outline region of the tumor or the defect side are specified as an important region (first portion), and a region other than the important region is specified as an unimportant region (second portion).

The above is the description of the process of specifying the first portion and the second portion at step S100 in the first embodiment.

After the process of specifying the first portion and the second portion is terminated, the present embodiment proceeds to the inference process of step S200.

Figure 7:
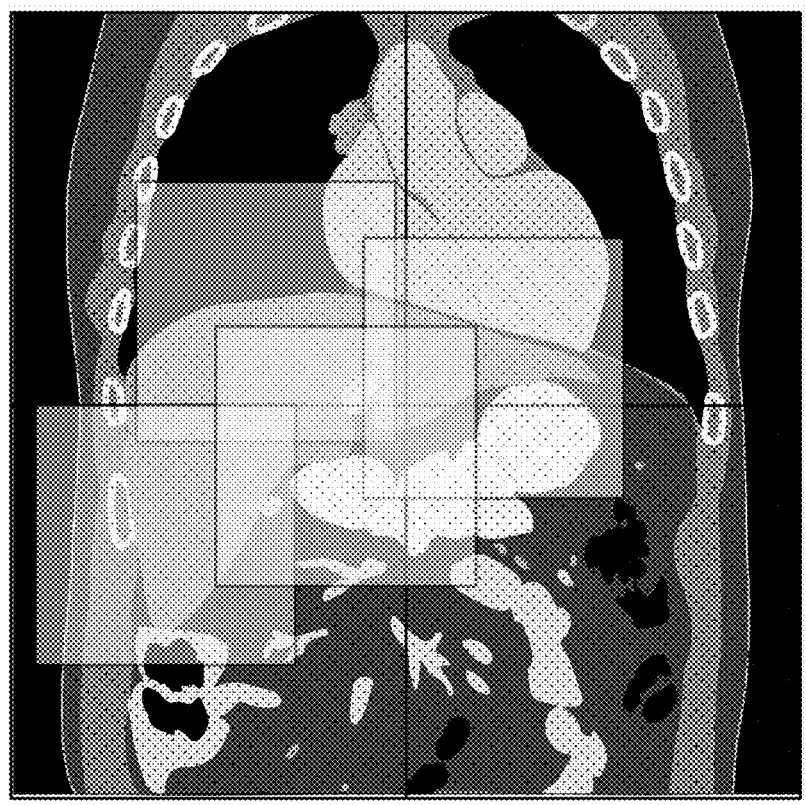
FIG. 7 is a schematic diagram illustrating a processing status of step S200 by the image processing system according to the first embodiment.

With reference to FIG. 7, the inference process of step S200 in the first embodiment is described below.

FIG. 7 is a schematic diagram illustrating a processing status of step S200 by the image processing system according to the first embodiment.

After the first portion (important region) and the second portion (unimportant region) are specified at step S100, the inference device 30 performs the first inference process and the second inference process, which are different inferences, on the first portion (important region) and the second portion (unimportant region), respectively, at step S200. Specifically, the inference device 30 performs enhanced inference on the specified first portion as the first inference process. As the enhanced inference, an image patch can be newly divided around the first portion for inference as illustrated in FIG. 7.

In addition, examples of the enhanced inference include a test time augmentation method such as flipping an image patch including the first portion and then performing an inference process again or increasing a patch overlap ratio between image patches when performing an inference process on the first portion. The present embodiment is not limited thereto, and other enhanced inference methods for segmentation known to those skilled in the art may be employed as the enhanced inference. The inference device 30 performs light inference, which has a lower processing load and higher speed, on the second portion as the second inference process. The inference device 30 can use the results of the light inference performed on the second portion when specifying the first portion and the second portion at step S100. Using the results of the light inference at step S100 as is is preferable because it can save the processing time, reduce the processing load, and increase the processing speed. The present embodiment is not limited thereto, and another light inference may be newly performed on the second portion as the second inference process.

After the inference process is terminated, the present embodiment proceeds to the integration process of step S300.

Figure 8:
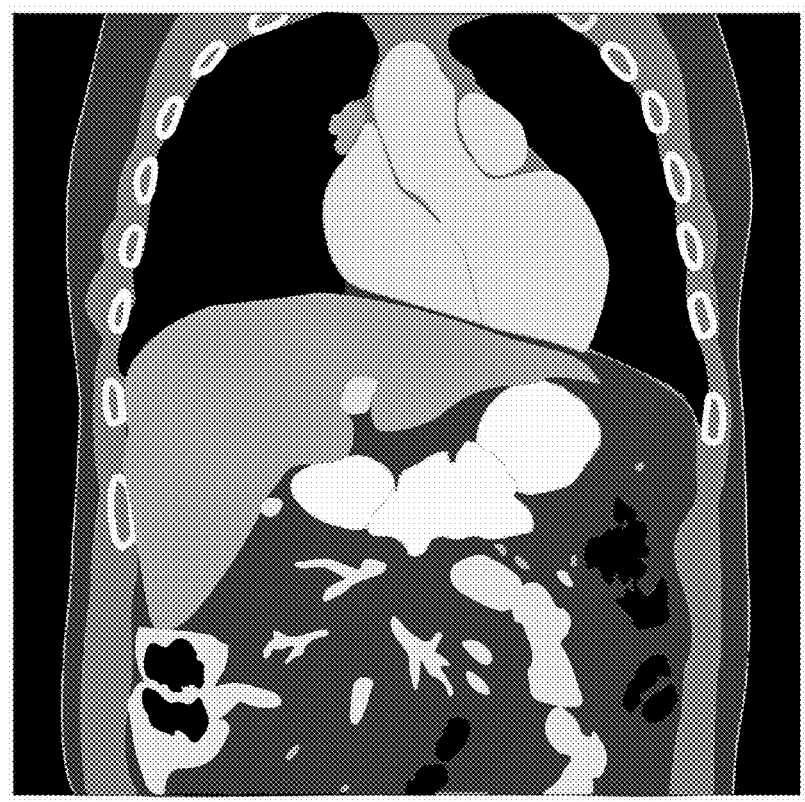
FIG. 8 is a schematic diagram illustrating a processing status of step S300 by the image processing system according to the first embodiment.

With reference to FIG. 8, the integration process of step S300 in the first embodiment is described below.

FIG. 8 is a schematic diagram illustrating a processing status of step S300 by the image processing system according to the first embodiment.

As illustrated in FIG. 8, at step S300, the integration device 40 integrates the results of the enhanced inference on the first portion and the light inference on the second portion obtained at step S200, and uses the integrated result as a complete inference result.

Specifically, the integration device 40 may integrate the inference results by directly superimposing the results of the enhanced inference on the first portion with the results of the light inference on the second portion. At step S200, when it is preferable to use the results of the light inference performed on the second portion when specifying the first portion and the second portion at step S100 as they are, the integration device 40 may directly overwrite the processing results of the enhanced inference performed on the first portion obtained at step S200 on the results of the light inference on the second portion obtained at step S100. The results of the enhanced inference on the first portion and the results of the light inference on the second portion may be fused and processed with a certain weight. When the liver is a segmentation target, the result of the integration process at step S300 is a complete liver segmentation result illustrated in FIG. 8.

Subsequently, the integration device 40 outputs the processing result of step S300 as a final result of the inference process.

In accordance with the image processing system according to the present embodiment, a determination step S400 and a correction step S500 may be further provided between step S300 and step S30 as a preferred embodiment as described above. At step S400, the image processing system 1 determines whether the integrated algorithm result is satisfied. When the determination result at step S400 is "YES", the process proceeds to step S30, outputs the algorithm result, and terminates the process. On the other hand, when the determination result of step S400 is "NO", the process proceeds to step S500 to correct the first portion and the second portion specified at step S100, and returns to the process of step S200 again.

Details of the process of the determination step S400 have been previously described with reference to FIG. 3. With reference to FIG. 9, the process of the correction step S500 is described below.

Figure 9A:
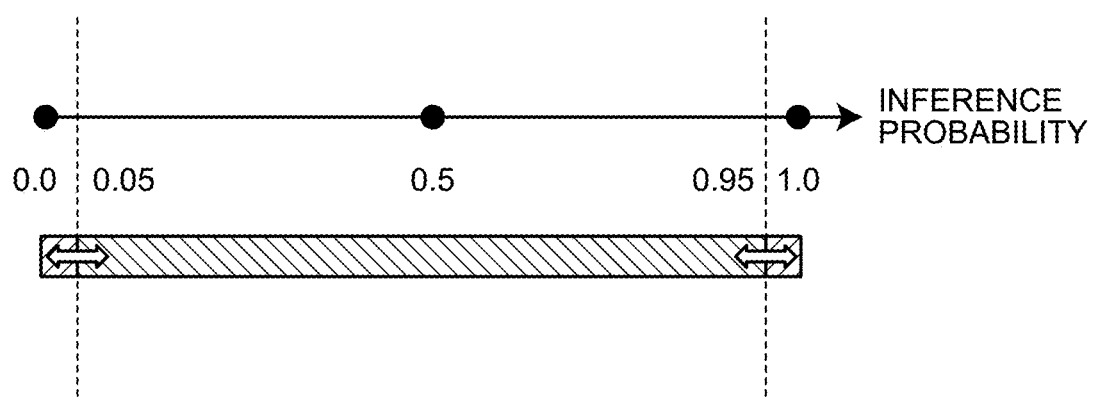
FIG. 9A is a schematic diagram illustrating a processing status of step S500 by the image processing system according to the first embodiment.
Figure 9B:
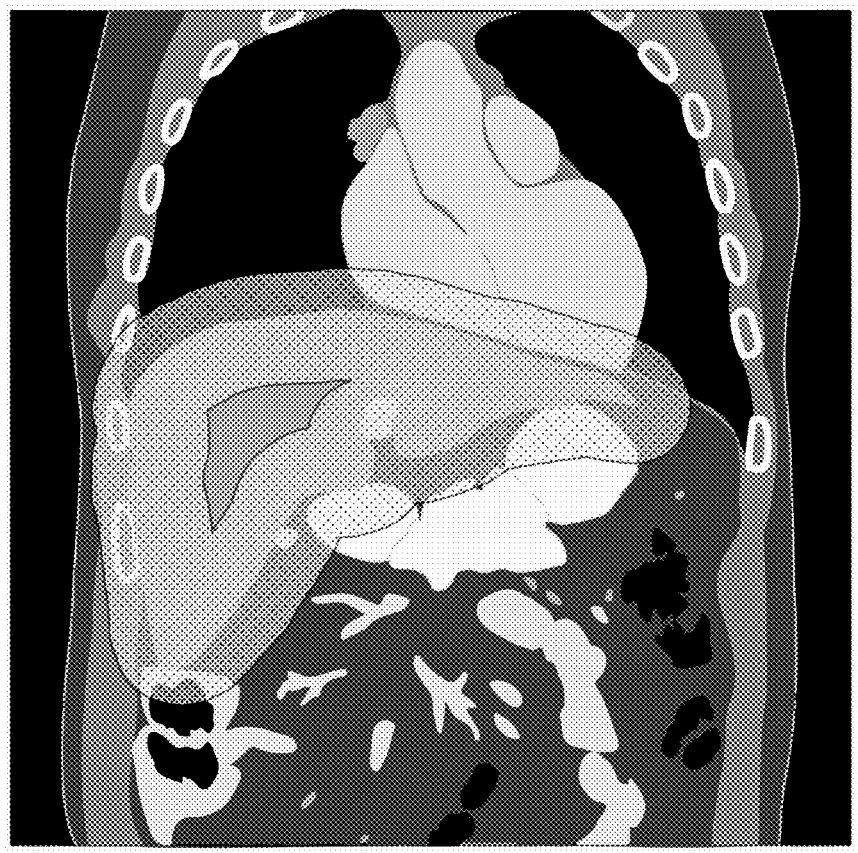
FIG. 9B is a schematic diagram illustrating the processing status of step S500 by the image processing system according to the first embodiment.

FIGS. 9A and 9B are schematic diagrams illustrating a processing status of step S500 by the image processing system according to the first embodiment.

As illustrated in FIG. 9A, the process of step S500 can be implemented by adjusting the lower limit value and the upper limit value of the important region inference probability range. Such adjustment may be automatically performed by the correction function of the image processing system 1 according to preset rules, or may be artificially performed by a user. As illustrated in FIG. 9B, the process of step S500 may be implemented, for example, by directly correcting, via a user interface, a previously obtained image including an important region (first portion) and an unimportant region (second portion) as illustrated in FIG. 6C. Such correction may be implemented by a user who clicks a corresponding region in the image with a mouse and drags and drops the region, or may be automatically performed by the system.

After step S500 is performed, the image processing system according to the present embodiment further performs the processes of step S200 and step S300 on the corrected first portion and the second portion other than the first portion until the determination result of step S400 is "YES", and performs the determination of step S400 again on the integrated algorithm result.

As described above, step S400 and step S500 are not essential. Even though the processes of step S400 and step S500 are not performed, the object of the present embodiment can be similarly achieved and the effects of the present embodiment can be similarly obtained.

Summary of First Embodiment

According to the first embodiment, the inference process of the present embodiment is used to perform segmentation on an image. The first portion is an important region important for image segmentation, and the second portion is an unimportant region not important for the image segmentation.

The specifying step performs segmentation on an image by using a deep learning model, acquires an inference result index indicating a segmentation result for each pixel in the image, specifies, as an important region, a region including pixels for which the inference result index is between a predetermined lower limit value and a predetermined upper limit value, and specifies a region other than the important region as an unimportant region. The inference step performs enhanced segmentation based on enhanced inference on the important region, uses a result of the enhanced segmentation as an inference result for the important region, and uses a segmentation result for the unimportant region at the specifying step as is as an inference result for the unimportant region. In this way, according to the present embodiment, an image to be processed is divided into the first portion and the second portion other than the first portion, and the first inference process and the second inference process, which are different inference processes, on the first portion and the second portion, respectively. Specifically, precise enhanced inference is performed on the first portion and faster normal inference is performed on the second portion. Subsequently, results of the enhanced inference and the normal inference are integrated to obtain a processing result for the entire image. This makes it possible to implement a balance between accuracy and speed during the deep learning model inference, and achieve more desirable inference results.

Since details of the deep learning and a method to segment an image using the deep learning model are well known in the art and are not key points of the present embodiment, detailed description thereof is omitted.

In the above description, inference probability is used as an example of the inference result index of the first embodiment; however, the present embodiment is not limited thereto and in addition to the inference probability, for example, inference uncertainty of the deep learning model may be used as the inference result index. Alternatively, an image processing method in the related art may be used to detect a difference in pixels of an image, and the detected difference may be used as the inference result index to specify the first portion of the image. Since details of the inference uncertainty are described in detail, for example, in Alex Kendall and Yarin Gal's paper "What Uncertainties Do We Need in Bayesian Deep Learning for Computer Vision?" (31$^{st}$ Conference on Neural Information Processing Systems (NIPS 2017), Long Beach, CA, USA.), detailed description thereof is omitted.

Second Embodiment

The first embodiment described above is an example in which the image processing system according to the present embodiment is applied to image segmentation; however, the embodiment is not limited thereto. For example, the image processing system according to the present embodiment can also be applied to image classification.

The second embodiment is an example in which the image processing system according to the present embodiment is applied to image classification.

The second embodiment is described in detail below with reference to FIGS. 10 to 14, taking a classification process for organ localization of the liver as an example.

In the description of the second embodiment, the differences from the first embodiment described above are mainly described, and the same configurations as in the first embodiment described above are denoted by the same reference numerals and description thereof is omitted.

Figure 10:
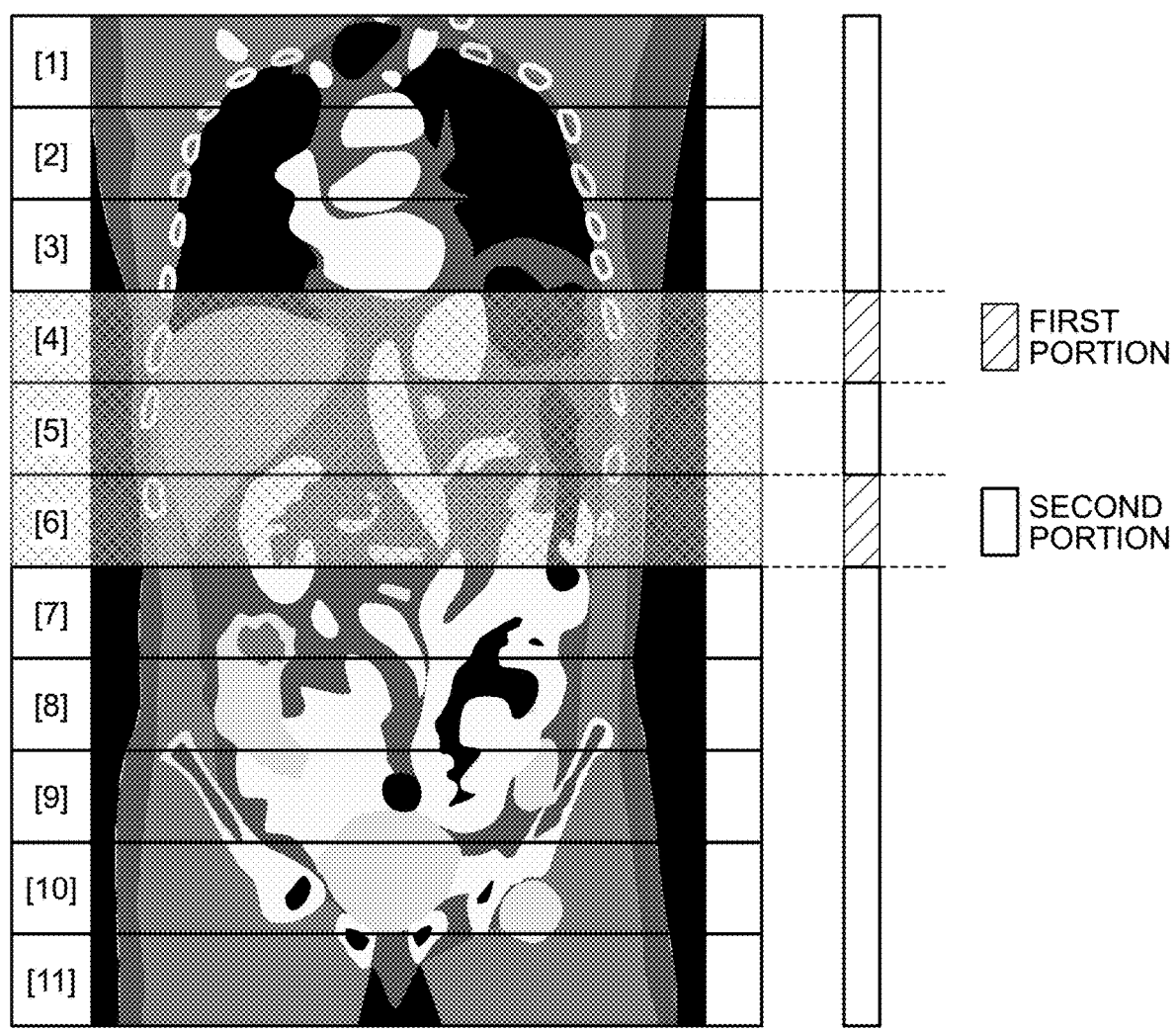
FIG. 10 is a schematic diagram illustrating a processing procedure for specifying a first portion and a second portion by an image processing system according to a second embodiment.
Figure 11:
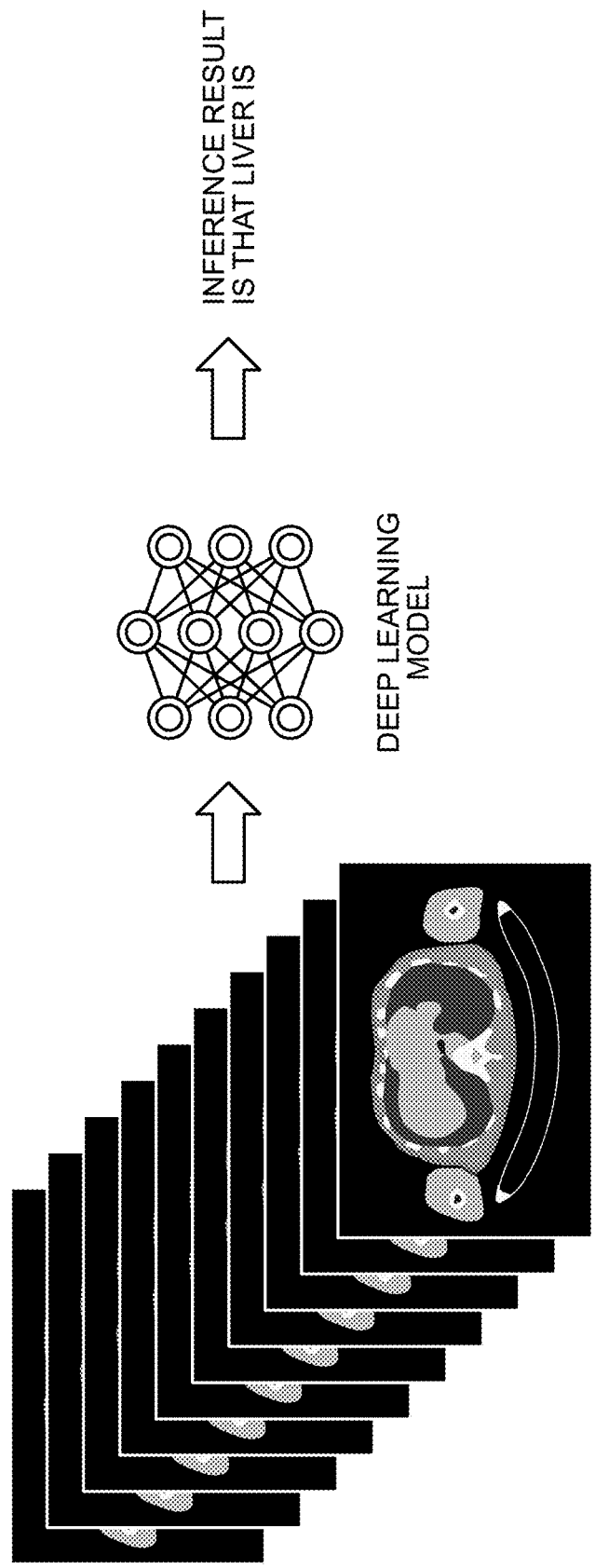
FIG. 11 is a schematic diagram illustrating a processing status at step S100 of a deep learning model of the image processing system according to the second embodiment.

With reference to FIGS. 10 and 11, a process of specifying a first portion and a second portion at step S100 in the second embodiment is first described.

In the case of the second embodiment in which a classification process for organ localization is performed on an image, the first portion and the second portion in the image in the present embodiment are different ranges of the number of images in a plurality of images. Specifically, the first portion and the second portion refer to the range of the number of important images that are important for classification and the range of the number of unimportant images that are not important for the classification, respectively, among the plurality of images.

FIG. 10 is a schematic diagram illustrating a processing procedure for specifying a first portion and a second portion by an image processing system according to the second embodiment.

FIG. 10 illustrates an example of performing a classification process for organ location of the liver, for example, on a series of images to be processed. As illustrated in FIG. 10, the image processing system according to the second embodiment, for example, classifies and detects a plurality of images by using a multi-channel deep learning model with respect to a set of a plurality of consecutive 2D images obtained for the upper body of a human, specifies, as the range of the number of important images (first portion), the range of a predetermined number of images near an image in which the classification and detection result suddenly changes among the plurality of images, and specifies the range of the number of other images as the range of the number of unimportant images (second portion). Specifically, the image processing system according to the second embodiment performs classification and detection for each group of the images by using a deep learning model with multi-channel input, and specifies, as the range of the number of important images, a group including images with a sudden change in the classification and detection result. The "group of the images" is a set of a plurality of consecutive 2D images within the range indicated by long rectangles extending in the left-right direction of the human body, numbered [1] to [11] in FIG. 10 (FIG. 10 illustrates only the range of images in each group and does not illustrate individual images within each group), and the number of images in each group is equal to the number of input channels in the model.

In the example illustrated in FIG. 10, by the classification and detection, for example, the image groups [4] to [6] in dark areas of the drawing are specified as image groups including the liver, and the other image groups [1] to [3] and [7] to [11] are specified as image groups without the liver. Among the image groups [4] to [6] including the liver, each of the image group [4] and the image group [6] includes a portion including a sudden change from an image without the liver to an image including the liver and a portion including a sudden change from an image including the liver to an image without the liver. On the other hand, in the image group [5], each image includes the liver and includes no portion where the sudden change has occurred. Consequently, the specifying device 20 according to the second embodiment specifies the image group [4] and the image group [6] as the range of the number of important images (first portion), and specifies the other image groups [1] to [3], image group [5], and image groups [7] to [11] as the range of the number of unimportant images (second portion).

FIG. 11 is a schematic diagram illustrating a processing status at step S100 of the deep learning model of the image processing system according to the second embodiment.

As illustrated in FIG. 11, at step S100, the specifying device 20 may infer a classification result of one group of images at a time by the multi-channel deep learning model. For example, when the number of channels is set to 10, 10 2D images are used as input to the model, and a result of whether the liver is present in the 10 images is obtained through one-time inference. In the present embodiment, when the inference result of one group of images, for example, the inference result of 10 images, indicates that the liver is present in at least one image, it is considered that the liver is present in the group of images. By adjusting the number of channels, the number of images in each group and the corresponding number of groups are adjusted.

Since the inference based on the multi-channel deep learning model has relatively high processing speed and low processing load, but has low classification accuracy, the inference based on the multi-channel deep learning model alone may produce an inaccurate result. After performing the inference based on the multi-channel deep learning model on a series of images to be processed, the specifying device 20 according to the second embodiment obtains a result indicating whether a sudden change is included in a classification result of images of each group in the entire image, specifies, as the range of the number of important images (first portion), an image group including the sudden change in the classification result, and specifies the other image groups as the range of the number of unimportant images (second portion). Subsequently, the image processing system according to the present embodiment performs more precise enhanced inference on the range of the number of important images (first portion).

With reference to FIG. 12, the process of step S200 in the second embodiment is described below.

FIG. 12 is a schematic diagram illustrating a processing status of step S200 by the image processing system according to the second embodiment.

After the first portion (range of the number of important images) and the second portion (range of the number of unimportant images) are specified at step S100, the inference device 30 performs a first inference process and a second inference process, which are different inference processes, on the first portion (range of the number of important images) and the second portion (range of the number of unimportant images), respectively, at step S200. Specifically, as illustrated in FIG. 12, the inference device 30 performs enhanced inference on the specified first portion as the first inference process. As the enhanced inference, inference based on a single-channel deep learning model can be performed on each image in the specified first portion, as illustrated in FIG. 12. By performing more precise inference on each image in the first portion by using the single-channel deep learning model, a more accurate classification result for each image can be obtained.

Although FIG. 12 illustrates an example in which the inference based on the single-channel deep learning model is performed as the enhanced inference; however, the present embodiment is not limited thereto and other enhanced inference methods for classification known to those skilled in the art may be employed as the enhanced inference in the second embodiment.

The inference device 30 performs light inference, which has a lower processing load and higher speed, on the second portion as the second inference process. As in the first embodiment, the inference device 30 of the second embodiment can use the results of the light inference performed on the second portion when specifying the first portion and the second portion at step S100. The present embodiment is not limited thereto, and another light inference may be newly performed on the second portion as the second inference process.

After the inference process is terminated, the present embodiment proceeds to the integration process of step S300.

Figure 13:
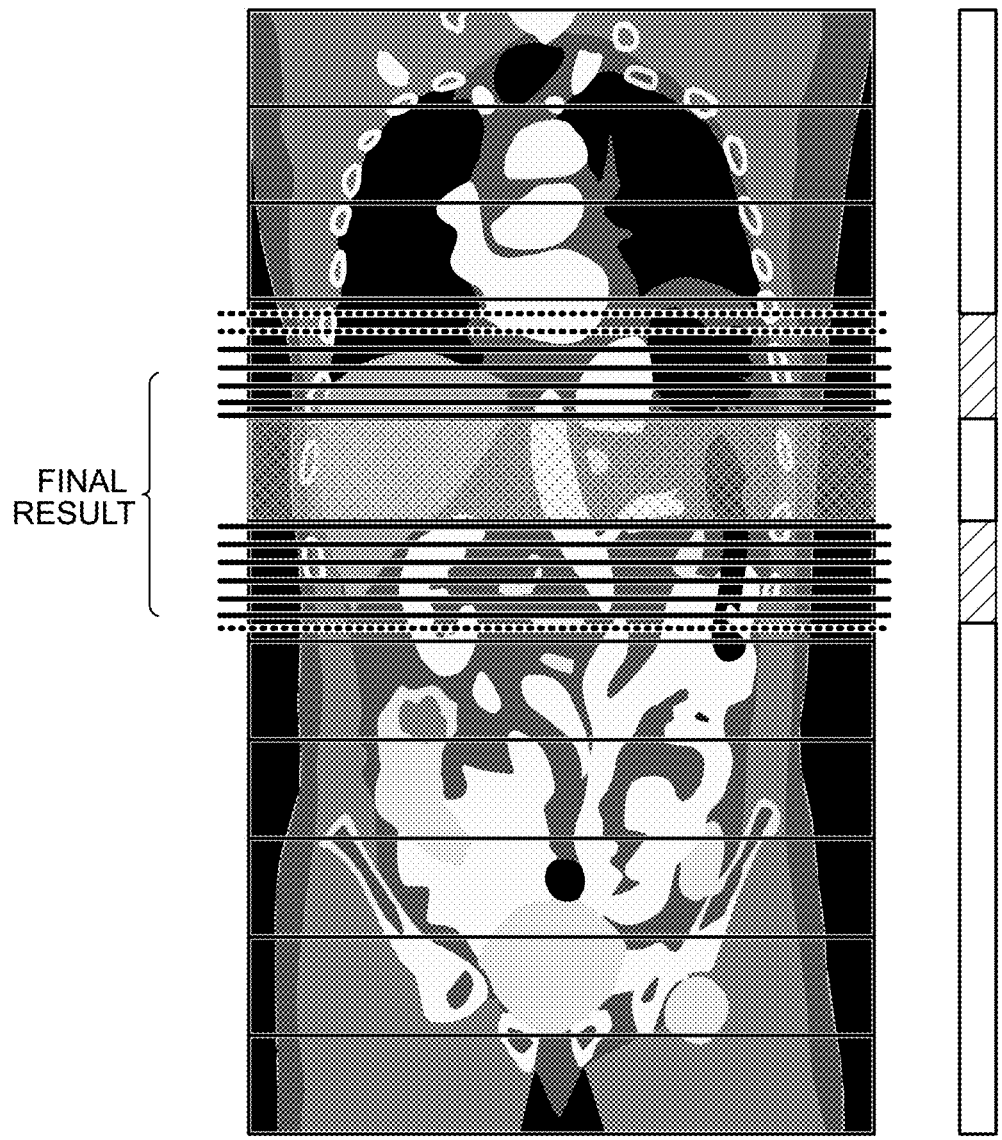
FIG. 13 is a schematic diagram illustrating a processing status of step S300 by the image processing system according to the second embodiment.

With reference to FIG. 13, the integration process of step S300 in the second embodiment is described below.

FIG. 13 is a schematic diagram illustrating a processing status of step S300 by the image processing system according to the second embodiment.

As illustrated in FIG. 13, at step S300, the integration device 40 integrates the results of the enhanced inference on the first portion and the light inference on the second portion obtained at step S200, and uses the integrated result as a complete inference result.

Since details of step S300 are the same as in the first embodiment, redundant description is omitted.

As illustrated in FIG. 13, in accordance with the image processing system according to the second embodiment, a more precise classification result such as an image in which the liver is not present at a position indicated by the broken line and an image in which the liver is present at a position indicated by the solid line can be obtained in the range of the number of important images (first portion) (group [4] and group [6]).

Subsequently, the integration device 40 outputs the processing result of step S300 as a final result of the inference process.

In accordance with the image processing system 1 according to the second embodiment, as in the first embodiment, a determination step S400 and a correction step S500 may be further provided between step S300 and step S30 as a preferred form as described above.

Details of the process of the determination step S400 are the same as described in the first embodiment with reference to FIG. 3. With reference to FIG. 14, the process of the correction step S500 of the second embodiment is described below.

FIG. 14 is a schematic diagram illustrating a processing status of step S500 by the image processing system according to the second embodiment.

As illustrated in FIG. 14, the process of step S500 can be implemented by adjusting the boundary of the range of the number of important images (first portion). As in the first embodiment, such adjustment may be automatically performed by the correction function of the image processing system according to preset rules, or may be implemented by a user who clicks a corresponding region in the image with a mouse and drags and drops the region.

After step S500 is performed, the image processing system according to the present embodiment further performs the processes of step S200 and step S300 on the corrected range of the number of important images (first portion) and the range of the number of unimportant images (second portion) other than the range of the number of important images until the determination result of step S400 is "YES", and performs the determination of step S400 again on the integrated algorithm result.

Also in the present embodiment, step S400 and step S500 are not essential as in the first embodiment. Even though the processes of step S400 and step S500 are not performed, the object of the present embodiment can be similarly achieved and the effects of the present embodiment can be similarly obtained.

Summary of Second Embodiment

According to the second embodiment, the inference process of the present embodiment is for positioning an organ included in an image on the basis of image classification. The receiving step receives a plurality of consecutive images. The first portion is the range of the number of important images, which is the range of the number of images important for the classification of a plurality of images, and the second portion is the range of the number of unimportant images, which is the range of the number of images not important for the classification of the plurality of images. The specifying step classifies and detects the plurality of images by using a multi-channel deep learning model, and specifies, as the range of the number of important images, the range of a predetermined number of images near an image in which the classification and detection result suddenly changes among the plurality of images, and specifies the range of the number of other images as the range of the number of unimportant images. The inference step classifies and detects the range of the number of important images by using a single-channel deep learning model, uses a result of the classification and detection as an inference result for the range of the number of important images, and uses the classification and detection result for the range of the number of unimportant images at the specifying step as is as the inference result for the range of the number of unimportant images. In this way, according to the present embodiment, as in the first embodiment, an image to be processed is divided into the first portion and the second portion other than the first portion, and the first inference process and the second inference process, which are different inference processes, on the first portion and the second portion, respectively. Specifically, precise enhanced inference is performed on the first portion and faster normal inference is performed on the second portion. Subsequently, results of the enhanced inference and the normal inference are integrated to obtain a processing result for the entire image. This makes it possible to implement a balance between accuracy and speed during deep learning model inference, and achieve more desirable inference results.

As described above, the image processing system according to the present embodiment can implement a balance between accuracy and speed during deep learning model inference. For example, in the first embodiment for image segmentation, the number of image patches for image inference in the present embodiment can be reduced to ½ or less of that in the related art without changing the inference accuracy. In the second embodiment for image classification, the inference accuracy is not changed, and taking 1000 whole-body CT images as an example, when light inference is performed once for every 10 images and enhanced inference is performed for every one image, the order of the image inference process in the present embodiment can be reduced to 20% or less of that in the related art.

OTHER EMBODIMENTS

In the embodiments described above, segmentation and classification of the liver have been described as an example; however, the present embodiment can also be applied to segmentation and classification of other organs and tissue structures other than the liver, and other types of image processing other than the segmentation and the classification.

Since the image processing, segmentation, classification, deep learning models, neural network training and inference, and the like described in the embodiments above can all be implemented using various methods in the related art, detailed description thereof is omitted.

The present embodiment may be implemented as the image processing system described above, or as an image processing method, an image processing program, or a storage medium storing the image processing program.

The image processing system according to the present application may be incorporated into a medical image diagnostic apparatus, or may perform processing independently. In such a case, the image processing system includes processing circuitry that performs the same process as in each of the steps described above, and a memory storing computer programs corresponding to respective functions, various types of information, and the like. The processing circuitry acquires 2-dimensional or 3-dimensional medical image data from a medical image diagnostic apparatus such as an ultrasonic diagnostic apparatus or an image storage apparatus via a network, and performs the process described above by using the acquired medical image data. The processing circuitry is a processor that reads the computer programs from the memory and executes the read computer programs, thereby implementing functions corresponding to the executed computer programs.

The term "processor" used in the description of the embodiment described above, for example, means circuitry such as a central processing unit (CPU), a graphics processing unit (GPU), an application specific integrated circuit (ASIC), or a programmable logic device (for example, a simple programmable logic device (SPLD), a complex programmable logic device (CPLD), and a field programmable gate array (FPGA)). Instead of storing the computer programs in the storage circuitry, the computer programs may be directly incorporated in the circuitry of the processor. In this case, the processor implements the functions by reading and executing the computer programs incorporated in the circuitry. Each processor of the present embodiment is not limited to being configured as single piece of circuitry for each processor, and one processor may be configured by combining a plurality of pieces of independent circuitry to implement the functions thereof.

Each component of each device illustrated in the description of the above embodiment is functionally conceptual, and does not necessarily have to be physically configured as illustrated in the drawings. That is, the specific form of distribution or integration of each device is not limited to that illustrated in the drawings, but can be configured by functionally or physically distributing or integrating all or part thereof in arbitrary units, depending on various loads, usage conditions, and the like. Moreover, each processing function performed by each device can be implemented in whole or in part by a CPU and a computer program that is analyzed and executed by the CPU, or by hardware using wired logic.

The processing methods described in the embodiments above can be implemented by executing a processing program prepared in advance on a computer such as a personal computer or a workstation. The processing program can be distributed via a network such as the Internet. The processing program is recorded on a non-transitory computer readable storage medium such as a hard disk, a flexible disk (FD), a compact disk read only memory (CD-ROM), a MO, a digital versatile disc (DVD), a universal serial bus (USB) memory, and a flash memory such as a secure digital (SD) card memory, and can also be executed by being read from the non-transitory storage medium by a computer.

Various types of data handled in the present specification are typically digital data.

According to at least one embodiment described above, it is possible to implement a balance between accuracy and speed during deep learning model inference, and achieve more desirable inference results.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method of performing an inference process on image data by using a trained deep learning model, the image processing method comprising:
   receiving an image;
   setting an anatomical site of a target;
   specifying a first portion and a second portion in the image, the first portion including a region corresponding to the anatomical site of the target, the second portion including a region different from the anatomical site of the target;
   by using the deep learning model, performing, as a first inference process, a segmentation process of specifying the region corresponding to the anatomical site of the target with respect to the first portion and performing, as a second inference process, a segmentation process of specifying the region different from the anatomical site of the target with respect to the second portion, wherein the specifying of the first portion and the second portion includes performing segmentation on the image by using the deep learning model, acquiring an inference result index indicating a segmentation result for each pixel in the image, specifying, as the first portion, a region including pixels for which the inference result index is between a predetermined lower limit value and a predetermined upper limit value, and specifying a region other than the first portion as the second portion, and the performing of the first inference process and the second inference process includes performing enhanced segmentation based on enhanced inference on the first portion, using a result of the enhanced segmentation as an inference result for the first portion, and using a segmentation result for the second portion at the specifying as is as an inference result for the second portion; and integrating results of the first inference process and the second inference process and outputting an integrated result.

2. The image processing method according to claim 1, wherein the inference result index is an inference probability.

3. The image processing method according to claim 1, wherein the inference result index is an inference uncertainty.

4. The image processing method according to claim 1, wherein the enhanced inference performs at least one of dividing image patches used during the inference process around the first portion, performing the inference again after flipping an image patch including the first portion, and increasing a patch overlap ratio between the image patches when performing the inference process on the first portion.

5. The image processing method according to claim 1, wherein
the receiving of the image includes receiving a plurality of consecutive images,
the specifying of the first portion and the second portion includes classifying and detecting the plurality of images by using a multi-channel deep learning model, specifying, as the first portion, a range of a predetermined number of images near an image in which a classification and detection result suddenly changes among the plurality of images, and specifying a range of a number of other images as the second portion,
the performing of the first inference process and the second inference process includes performing, as the first inference process, a classification process of classifying and detecting an image including the region corresponding to the anatomical site of the target with respect to the first portion and performing, as the second inference process, a classification process of classifying and detecting an image including the region different from the anatomical site of the target with respect to the second portion; and
the performing of the first inference process and the second inference process further includes classifying and detecting the first portion by using a single channel deep learning model, using a result of the classification and detection as an inference result for the first portion, and using a classification and detection result for the second portion at the specifying as is as an inference result for the second portion.

6. The image processing method according to claim 1, further comprising correcting the integrated result by adjusting the first portion.

7. An image processing system that performs an inference process on image data by using a trained deep learning model, the image processing system comprising:
a receiving device configured to receive an image;
a specifying device configured to set an anatomical site of a target, and to specify a first portion and a second portion in the image, the first portion including a region corresponding to the anatomical site of the target, the second portion including a region different from the anatomical site of the target;
an inference device configured to, by using the deep learning model, perform, as a first inference process, a segmentation process of specifying the region corresponding to the anatomical site of the target with respect to the first portion and perform, as a second inference process, a segmentation process of specifying the region different from the anatomical site of the target with respect to the second portion, wherein the specifying of the first portion and the second portion includes performing segmentation on the image by using the deep learning model, acquiring an inference result index indicating a segmentation result for each pixel in the image, specifying, as the first portion, a region including pixels for which the inference result index is between a predetermined lower limit value and a predetermined upper limit value, and specifying a region other than the first portion as the second portion, and the performing of the first inference process and the second inference process includes performing enhanced segmentation based on enhanced inference on the first portion, using a result of the enhanced segmentation as an inference result for the first portion, and using a segmentation result for the second portion at the specifying as is as an inference result for the second portion; and
an integration device configured to integrate results of the first inference process and the second inference process and output an integrated result.

8. A non-transitory computer readable medium storing a plurality of instructions that is executable by a computer and performs an inference process on image data by using a trained deep learning model, wherein the plurality of instructions causes the computer to execute:
receiving an image;
setting an anatomical site of a target;
specifying a first portion and a second portion in the image, the first portion including a region corresponding to the anatomical site of the target, the second portion including a region different from the anatomical site of the target;
by using the deep learning model, performing, as a first inference process, a segmentation process of specifying the region corresponding to the anatomical site of the target with respect to the first portion and performing, as a second inference process, a segmentation process of specifying the region different from the anatomical site of the target with respect to the second portion, wherein the specifying of the first portion and the second portion includes performing segmentation on the image by using the deep learning model, acquiring an inference result index indicating a segmentation result for each pixel in the image, specifying, as the first portion, a region including pixels for which the inference result index is between a predetermined lower limit value and a predetermined upper limit value, and specifying a region other than the first portion as the second portion, and the performing of the first inference process and the second inference process includes performing enhanced segmentation based on enhanced inference on the first portion, using a result of the enhanced segmentation as an inference result for the first portion, and using a segmentation result for the second portion at the specifying as is as an inference result for the second portion; and integrating results of the first inference process and the second inference process and outputting an integrated result.

\* \* \* \* \*